(12) United States Patent
Luo et al.

(10) Patent No.: US 12,068,952 B2
(45) Date of Patent: Aug. 20, 2024

(54) ROUTING INFORMATION PUBLISHING METHOD, APPARATUS, AND SYSTEM

(71) Applicant: HUAWEI TECHNOLOGIES CO., LTD., Guangdong (CN)

(72) Inventors: Xianlong Luo, Wuhan (CN); Yu Zheng, Dongguan (CN); Wei Chen, Wuhan (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/870,678

(22) Filed: Jul. 21, 2022

(65) Prior Publication Data

US 2022/0360526 A1 Nov. 10, 2022

Related U.S. Application Data

(63) Continuation of application No. PCT/CN2020/116606, filed on Sep. 21, 2020.

(30) Foreign Application Priority Data

Jan. 22, 2020 (CN) .......................... 202010075539.9

(51) Int. Cl.
*H04L 45/655* (2022.01)
*H04L 45/036* (2022.01)
*H04W 40/02* (2009.01)

(52) U.S. Cl.
CPC .......... *H04L 45/655* (2022.05); *H04L 45/036* (2022.05); *H04W 40/02* (2013.01)

(58) Field of Classification Search
CPC ..... H04L 45/655; H04L 45/036; H04W 40/02
USPC ......................................................... 709/224
See application file for complete search history.

(56) References Cited

U.S. PATENT DOCUMENTS

| | | | |
|---|---|---|---|
| 7,508,772 B1* | 3/2009 | Ward | H04L 45/22 370/254 |
| 2008/0049621 A1 | 2/2008 | McGuire et al. | |
| 2010/0329270 A1* | 12/2010 | Asati | H04L 45/02 370/401 |
| 2015/0381479 A1 | 12/2015 | Kamath et al. | |

(Continued)

FOREIGN PATENT DOCUMENTS

| | | |
|---|---|---|
| CN | 102316028 A | 1/2012 |
| CN | 102780605 A | 11/2012 |

(Continued)

*Primary Examiner* — Zi Ye
(74) *Attorney, Agent, or Firm* — WOMBLE BOND DICKINSON (US) LLP

(57) ABSTRACT

Embodiments of this application relate to the field of communication technologies, and provide a routing information publishing method. The method includes: An edge transport device connected to a first edge device in a first network domain receives, based on a control plane protocol message, first routing information that is from a controller and that includes an address of a second edge device in a second network domain and a destination address of the second network domain, and sends the first routing information to the first edge device, so that the first edge device generates, based on the first routing information, a forwarding table that is of the first edge device and that is used to indicate a forwarding relationship between the first network domain and the second network domain.

20 Claims, 9 Drawing Sheets

(56) References Cited

U.S. PATENT DOCUMENTS

2016/0285740 A1* 9/2016 Yang ................. H04L 45/04
2018/0109493 A1* 4/2018 Khan ................. H04L 63/0209
2019/0036687 A1  1/2019 Raza et al.
2021/0344714 A1* 11/2021 Yang ................. H04L 45/745

FOREIGN PATENT DOCUMENTS

| CN | 103229468 A | 7/2013 |
| CN | 110622473 A | 12/2019 |
| WO | 2019210769 A1 | 11/2019 |

* cited by examiner

| 0 1 2 3 4 5 6 7 | 8 9 0 1 2 3 4 5 | 6 7 8 9 0 1 2 3 4 5 6 7 8 9 0 1 |
|---|---|---|
| Version number | Flag bit | Message length |
| Object type extension | Object type | Reserved | P | 1 | Object length |
| IP address of a second edge device ||| 
| MAC address of the second edge device |||
| Destination address of a second network domain |||

| Type | Length |
|------|--------|
| IP address of a second device ||
| IP address prefix | |

FIG. 4b

| 0 1 2 3 | 4 5 6 7 | 8 9 0 1 2 3 4 5 | 6 7 8 9 0 1 2 3 4 5 6 7 8 9 0 1 |
|---|---|---|---|
| Version number | Flag bit | Message type | Message length |
| Object type extension | | Object type | Reserved | P | I | Object length |
| IP address of a second edge device ||||
| MAC address of the second edge device ||||
| Destination address 1 of a second network domain ||||
| Destination address 2 of the second network domain ||||

FIG. 4c

| 0 1 2 3 4 5 6 7 | 8 9 0 1 2 3 4 5 | 6 7 8 9 0 1 2 3 4 5 6 7 8 9 0 1 |
|---|---|---|
| Version number / Flag bit | Message type | Message length |
| Object type extension | Object type | Reserved / P / I | Object length |
| IP address of an OLT 1 |||
| MAC address of the OLT1 |||
| IP address of an ONT 1 |||

FIG. 7

Routing table
| Destination address | Next hop | Outbound interface |
|---|---|---|
| IP address of an ONT 1 | IP address of an OLT 1 | Outbound interface 1 |
| IP address of an ONT 2 | IP address of the OLT 1 | Outbound interface 1 |
| IP address of an ONT 3 | IP address of an OLT 2 | Outbound interface 2 |
ARP table
| IP address | MAC address |
|---|---|
| IP address of the OLT 1 | MAC address of the OLT 1 |
| IP address of the OLT 2 | MAC address of the OLT 2 |
FIG. 8
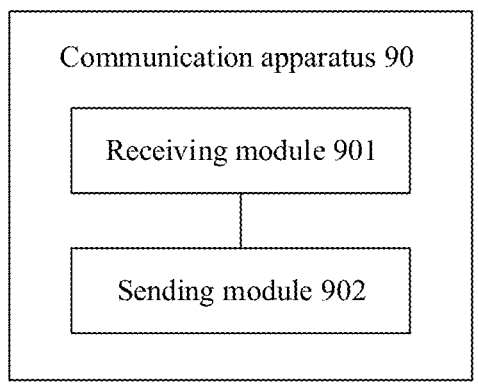
FIG. 9
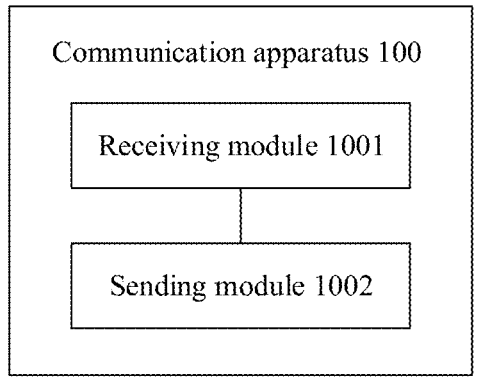
FIG. 10

ROUTING INFORMATION PUBLISHING METHOD, APPARATUS, AND SYSTEM

CROSS-REFERENCE TO RELATED APPLICATIONS

This application is a continuation of International Application No. PCT/CN2020/116606, filed on Sep. 21, 2020, which claims priority to Chinese Patent Application No. 202010075539.9, filed on Jan. 22, 2020. The disclosures of the aforementioned applications are hereby incorporated by reference in their entireties.

TECHNICAL FIELD

This application relates to the field of communication technologies, and in particular, to a routing information publishing method, an apparatus, and a system.

BACKGROUND

With rapid development of communication technologies, services such as a virtual reality (VR) game and an ultra-high definition video are commonly used, and therefore a user has an increasingly strong requirement on high bandwidth and a low delay of a service. To meet the requirement of the user, an optical transport network (optical transport network, OTN) is proposed to transmit service data.

For example, as shown in FIG. 1b, the OTN includes a plurality of OTN pipes (for example, an OTN pipe ①, an OTN pipe ②, an OTN pipe ③, and an OTN pipe ④). For each OTN pipe, there is an access OTN device at one end, and there is a core OTN device at the other end. A connection is established between an optical line terminal (OLT) and a router by using the OTN pipe. An optical network terminal (ONT) may include a destination address in service data, and send the service data to the OLT. The destination address is used to identify an application server. The OLT determines an IP address of a next-hop router in a preconfigured routing table based on the destination address in the service data, determines a MAC address of the next-hop router based on a preconfigured address resolution protocol (ARP) table, and sends the service data to the next-hop router through the OTN pipe based on the MAC address. The next-hop router forwards the service data to the corresponding application server based on the destination address in the service data. The application server processes the service data. Correspondingly, a process in which the application server sends service data to the ONT is similar to the foregoing process. Details are not described.

In the conventional technology, the routing table and the ARP table may be configured for the OLT and the router in the following two manners: a static configuration manner and a route flooding learning manner. In the static configuration manner, the routing table and the ARP table are manually configured or configured by using an automatic configuration tool (for example, a software-defined networking (SDN) controller or a network management system) for each OLT and each router. In the route flooding learning manner, each OLT performs route flooding learning to obtain the routing table and the ARP table. For example, the OLT may flood an interior gateway protocol (IGP) message through an OTN pipe connected to the OLT, to obtain the routing table, and learns the routing table based on an address resolution protocol, to obtain the ARP table. Similarly, each router may also obtain the routing table and the ARP table in the route flooding learning manner.

However, in an existing communication system to which the OTN is applied, there are an excessively large quantity of OLTs. If the static configuration manner is applied, there is highly complex and time-consuming routing configuration and a heavy workload in the entire communication system. If the route flooding learning manner is applied, a relatively large quantity of OTN pipes are preconfigured because there are an excessively large quantity of OLTs in the network, and when route flooding is performed, there is excessively heavy burden on hardware resources such as a central processing unit (CPU) and a memory of each OLT and each router in the communication system. The OLT is usually a small device, and it is very difficult to support this manner. In addition, in a data transmission process, an OTN pipe that is not used still occupies network resources because the OTN pipe is configured, resulting in a waste of network resources.

SUMMARY

This application provides a routing information publishing method, an apparatus, and a system, to resolve a technical problem that in an existing communication system in which an OTN is applied, during configuration of a routing table and an ARP table, there is highly complex and time-consuming routing configuration and a heavy workload if a static configuration manner is applied and there is a waste of network resources and heavy burden on hardware resources of devices in the network due to a relatively large quantity of pre-established OTN pipes if a route flooding learning manner is applied.

To achieve the foregoing objectives, the following technical solutions are used in embodiments of this application:

According to a first aspect, a routing information publishing method is provided. The method is applied to an edge transport device located in a transport network. The transport network is centrally controlled by a controller, and the transport network is used to connect a first network domain and a second network domain. The first network domain includes a first edge device, and the second network domain includes a second edge device. The edge transport device is connected to the first edge device. The method includes: The edge transport device receives first routing information that includes an address of the second edge device and a destination address of the second network domain from the controller based on a control plane protocol message; and sends the first routing information to the first edge device, where the first routing information is used to generate a forwarding table that is of the first edge device and that is used to indicate a forwarding relationship between the first network domain and the second network domain.

Based on the method in the first aspect, the edge transport device receives, based on a control plane protocol, the routing information sent by the controller, and sends the received routing information to the edge device, and the edge device automatically generates the forwarding table based on the received routing information. In this way, the routing information may be sent in the transport network by using the existing control plane protocol, to implement that a control plane in the transport network is reachable, and the routing information is sent without occupying a large quantity of data bandwidth resources in the transport network, and therefore network resources of a data plane in the transport network are saved. Furthermore, no massive transport pipes need to be pre-established to perform route flooding, and the edge device and the edge transport device do not need to generate the forwarding table by using the transport pipe in a route flooding learning manner, and therefore processing burden imposed on hardware resources when the edge device and the edge transport device generate the forwarding table in the route flooding learning manner is reduced. In addition, the edge device may automatically generate the forwarding table based on the routing information sent by the edge transport device, and the forwarding table does not need to be configured for the edge device in a static configuration manner, and therefore complexity and a workload of routing configuration are reduced, and a configuration time is shortened.

In an embodiment, the edge transport device receives second routing information that includes an address of the first edge device and a destination address of the first network domain from the first edge device; and sends the second routing information to the controller.

Based on this embodiment, the edge transport device sends the second routing information from the first edge device to the controller, so that the controller may send the second routing information from the first edge device to the second edge device by using another edge transport device connected to the second edge device, and the second edge device automatically generates a forwarding table of the second edge device based on the received second routing information, to forward service data between the first network domain and the second network domain based on the forwarding table. In this way, the forwarding table does not need to be configured for the edge device in the static configuration manner, and therefore the complexity and the workload of routing configuration are reduced, and the configuration time is shortened.

In an embodiment, the address of the second edge device includes an IP address and/or a MAC address. For example, the address of the second edge device includes the IP address and the MAC address of the second edge device, and the destination address of the second network domain includes an IP address of the second network domain.

In an embodiment, the forwarding table includes a routing table and an ARP table.

Based on this embodiment, the first edge device establishes the routing table and the ARP table based on the first routing information, so that in a transmission process of the service data, an IP address of a next hop may be determined based on the routing table, a MAC address corresponding to the IP address of the next hop may be determined based on the ARP table, and the service data may be sent to the next hop based on the MAC address, to implement layer 3 routing and forwarding and layer 2 routing and forwarding.

In an embodiment, the first edge device is a user-side network device, and the second edge device is a server-side network device; or the first edge device is a server-side network device, and the second edge device is a user-side network device.

Based on this embodiment, the first edge device may be a user-side network device, and the second edge device may be a server-side network device; or the first edge device may be a server-side network device, and the second edge device may be a user-side network device. This is not limited. In other words, the method in this embodiment may be implemented by the user-side device or the server-side device. In this way, implementation flexibility of the method is improved.

In an embodiment, the edge transport device sends the first routing information to the first edge device based on a control protocol at a network layer or a data link layer.

Based on this embodiment, the edge transport device may send the routing information to the edge device based on the control protocol at the network layer or the data link layer, to implement that the control plane is reachable, and there is no need to occupy a large quantity of data bandwidth resources, and therefore network resources of the data plane are saved.

According to a second aspect, a communication apparatus is provided. The communication apparatus may implement the function performed by the edge transport device in the first aspect or embodiments of the first aspect. The function may be implemented by hardware by executing corresponding software. The hardware or the software includes one or more modules corresponding to the foregoing functions. For example, the communication apparatus includes a receiving module and a sending module.

The receiving module is configured to receive first routing information that includes an address of a second edge device and a destination address of a second network domain from a controller based on a control plane protocol message.

The sending module is configured to send the first routing information to a first edge device. The first routing information is used to generate a forwarding table that is of the first edge device and that is used to indicate a forwarding relationship between a first network domain and the second network domain.

For a specific implementation of the communication apparatus, refer to the behavior function of the edge transport device in the routing information publishing method provided in any one of the first aspect or embodiments of the first aspect. Based on the communication apparatus in the second aspect, an edge transport device receives, based on a control plane protocol, the routing information sent by the controller, and sends the received routing information to the edge device, and the edge device automatically generates the forwarding table based on the received routing information. In this way, the routing information may be sent in a transport network by using the existing control plane protocol, to implement that a control plane in the transport network is reachable, and the routing information is sent without occupying a large quantity of data bandwidth resources in the transport network, and therefore network resources of a data plane in the transport network are saved. Furthermore, no massive transport pipes need to be pre-established to perform route flooding, and the edge device and the edge transport device do not need to generate the forwarding table by using the transport pipe in a route flooding learning manner, and therefore processing burden imposed on hardware resources when the edge device and the edge transport device generate the forwarding table in the route flooding learning manner is reduced. In addition, the edge device may automatically generate the forwarding table based on the routing information sent by the edge transport device, and the forwarding table does not need to be configured for the edge device in a static configuration manner, and therefore complexity and a workload of routing configuration are reduced, and a configuration time is shortened.

In an embodiment, the receiving module is further configured to receive second routing information that includes an address of the first edge device and a destination address of the first network domain from the first edge device; and the sending module is further configured to send the second routing information to the controller.

Based on this embodiment, the edge transport device sends the second routing information from the first edge device to the controller, so that the controller may send the second routing information from the first edge device to the second edge device by using another edge transport device connected to the second edge device, and the second edge device automatically generates a forwarding table of the second edge device based on the received second routing information, to forward service data between the first network domain and the second network domain based on the forwarding table. In this way, the forwarding table does not need to be configured for the edge device in the static configuration manner, and therefore the complexity and the workload of routing configuration are reduced, and the configuration time is shortened.

In an embodiment, the address of the second edge device includes an IP address and/or a MAC address. For example, the address of the second edge device includes the IP address and the MAC address of the second edge device, and the destination address of the second network domain includes an IP address of the second network domain.

In an embodiment, the forwarding table includes a routing table and an ARP table.

Based on this embodiment, the first edge device establishes the routing table and the ARP table based on the first routing information, so that in a transmission process of the service data, an IP address of a next hop may be determined based on the routing table, a MAC address corresponding to the IP address of the next hop may be determined based on the ARP table, and the service data may be sent to the next hop based on the MAC address, to implement layer 3 routing and forwarding and layer 2 routing and forwarding.

In an embodiment, the first edge device is a user-side network device, and the second edge device is a server-side network device; or the first edge device is a server-side network device, and the second edge device is a user-side network device.

Based on this embodiment, the first edge device may be a user-side network device, and the second edge device may be a server-side network device; or the first edge device may be a server-side network device, and the second edge device may be a user-side network device. This is not limited. In other words, the method in this embodiment may be implemented by the user-side device or the server-side device. In this way, implementation flexibility of the method is improved.

In an embodiment, the sending module is further configured to send the first routing information to the first edge device based on a control protocol at a network layer or a data link layer.

Based on this embodiment, the edge transport device may send the routing information to the edge device based on the control protocol at the network layer or the data link layer, to implement that the control plane is reachable, and there is no need to occupy a large quantity of data bandwidth resources, and therefore network resources of the data plane are saved.

According to a third aspect, a communication apparatus is provided. The communication apparatus may be an edge transport device or a chip or a system on chip in an edge transport device. The communication apparatus may implement the function performed by the edge transport device in the foregoing aspect or embodiments. The function may be implemented by hardware. In an embodiment, the communication apparatus may include a transceiver. The transceiver may be configured to support the communication apparatus in implementing the function in any one of the first aspect or embodiments of the first aspect. For example, the transceiver may be configured to receive first routing information that includes an address of a second edge device and a destination address of a second network domain from a controller based on a control plane protocol message, and the transceiver may be further configured to send the first routing information to a first edge device. The first routing information is used to generate a forwarding table that is of the first edge device and that is used to indicate a forwarding relationship between a first network domain and the second network domain. In another embodiment, the communication apparatus may further include a storage. The storage is configured to store computer-executable instructions and data that are necessary for the communication apparatus. When the communication apparatus runs, the transceiver executes the computer-executable instructions stored in the storage, so that the communication apparatus performs the routing information publishing method in any one of the first aspect or embodiments of the first aspect.

For a specific implementation of the communication apparatus, refer to the behavior function of the edge transport device in the routing information publishing method provided in any one of the first aspect or embodiments of the first aspect.

According to a fourth aspect, a communication apparatus is provided. The communication apparatus includes one or more processors and one or more storages. The one or more storages are coupled to the one or more processors, and the one or more storages are configured to store computer program code or computer instructions. When the one or more processors execute the computer instructions, the communication apparatus is enabled to perform the routing information publishing method in any one of the first aspect or embodiments of the first aspect.

According to a fifth aspect, a computer-readable storage medium is provided. The computer-readable storage medium stores computer instructions or a program. When the computer instructions or the program are or is run on a computer, the computer is enabled to perform the routing information publishing method in any one of the first aspect or embodiments of the first aspect.

According to a sixth aspect, a computer program product that includes instructions is provided. When the computer program product is run on a computer, the computer is enabled to perform the routing information publishing method in any one of the first aspect or embodiments of the first aspect.

For technical effects brought by any embodiments of the third aspect to the sixth aspect, refer to the technical effects brought by embodiment of the first aspect and the second aspect. Details are not described.

According to a seventh aspect, a routing information publishing method is provided. The method is applied to a controller. The controller centrally controls a transport network that includes a first edge transport device and a second edge transport device. The transport network is used to connect a first network domain and a second network domain. The first network domain includes a first edge device, and the second network domain includes a second edge device. The first edge transport device is connected to the first edge device, and the second edge transport device is connected to the second edge device. The method includes: The controller receives first routing information that includes an address of the second edge device and a destination address of the second network domain from the second edge transport device based on a control plane protocol message; and sends the first routing information to the first edge transport device, where the first routing information is used to generate a forwarding table that is of the first edge device and that is used to indicate a forwarding relationship between the first network domain and the second network domain.

Based on the method in the seventh aspect, the controller receives the routing information based on the control plane protocol message, and sends the received routing information to the edge device, and the edge device automatically generates the forwarding table based on the received routing information. In this way, the routing information may be sent in the transport network by using an existing control plane protocol, to implement that a control plane in the transport network is reachable, and the routing information is sent without occupying a large quantity of data bandwidth resources in the transport network, and therefore network resources of a data plane in the transport network are saved. Furthermore, no massive transport pipes need to be pre-established to perform route flooding, and the edge device and the edge transport device do not need to generate the forwarding table by using the transport pipe in a route flooding learning manner, and therefore processing burden imposed on hardware resources when the edge device and the edge transport device generate the forwarding table in the route flooding learning manner is reduced. In addition, the edge device may automatically generate the forwarding table based on the routing information sent by the edge transport device, and the forwarding table does not need to be configured for the edge device in a static configuration manner, and therefore complexity and a workload of routing configuration are reduced, and a configuration time is shortened.

In an embodiment, the controller receives second routing information that includes an address of the first edge device and a destination address of the first network domain from the first edge transport device based on the control plane protocol message; and sends the second routing information to the second edge transport device. The second routing information is used to generate a forwarding table that is of the second edge device and that is used to indicate the forwarding relationship between the first network domain and the second network domain.

Based on this embodiment, the controller receives the routing information based on the control plane protocol message, and sends the received routing information to the edge device, and the edge device automatically generates the forwarding table based on the received routing information. In this way, the routing information may be sent in the transport network by using an existing control plane protocol, to implement that a control plane in the transport network is reachable, and the routing information is sent without occupying a large quantity of data bandwidth resources in the transport network, and therefore network resources of a data plane in the transport network are saved. Furthermore, no massive transport pipes need to be pre-established to perform route flooding, and the edge device and the edge transport device do not need to generate the forwarding table by using the transport pipe in a route flooding learning manner, and therefore processing burden imposed on hardware resources when the edge device and the edge transport device generate the forwarding table in the route flooding learning manner is reduced. In addition, the edge device may automatically generate the forwarding table based on the routing information sent by the edge transport device, and the forwarding table does not need to be configured for the edge device in a static configuration manner, and therefore complexity and a workload of routing configuration are reduced, and a configuration time is shortened.

In an embodiment, the controller receives first routing information from a plurality of second edge transport devices in the transport network; and sends the received first routing information from the plurality of second edge transport devices to the first edge transport device based on a same control plane protocol message.

Based on this embodiment, the controller may send the first routing information from the plurality of second edge transport devices to the first edge transport device based on the same control plane protocol message, to reduce signaling interaction.

In an embodiment, the controller receives second routing information from a plurality of first edge transport devices in the transport network; and sends the received second routing information from the plurality of first edge transport devices to the second edge transport device based on a same control plane protocol message.

Based on this embodiment, the controller may send the second routing information from the plurality of first edge transport devices to the second edge transport device based on the same control plane protocol message, to reduce signaling interaction.

In an embodiment, the first edge transport device is a user-side edge transport device, and the second edge transport device is a server-side edge transport device; or the first edge transport device is a server-side edge transport device, and the second edge transport device is a user-side edge transport device.

Based on this embodiment, the first edge transport device may be a user-side edge transport device, and the second edge transport device may be a server-side edge transport device; or the first edge transport device may be a server-side edge transport device, and the second edge transport device may be a user-side edge transport device. This is not limited. In other words, the method in this embodiment may be implemented by the user-side device or the server-side device. In this way, implementation flexibility of the method is improved.

In an embodiment, the controller sends the first routing information to the first edge transport device based on the control plane protocol message; and the controller sends the second routing information to the second edge transport device based on the control plane protocol message.

Based on this embodiment, the controller may send the routing information to the edge transport device based on the control plane protocol message, to implement that the control plane is reachable, and there is no need to occupy a large quantity of data bandwidth resources, and therefore network resources of the data plane are saved.

According to an eighth aspect, a communication apparatus is provided. The communication apparatus may implement the function performed by the controller in the seventh aspect or embodiments of the seventh aspect. The function may be implemented by hardware by executing corresponding software. The hardware or the software includes one or more modules corresponding to the foregoing functions. For example, the communication apparatus includes a receiving module and a sending module.

The receiving module is configured to receive first routing information that includes an address of a second edge device and a destination address of a second network domain from a second edge transport device based on a control plane protocol message.

The sending module is configured to send the first routing information to a first edge transport device. The first routing information is used to generate a forwarding table that is of a first edge device and that is used to indicate a forwarding relationship between a first network domain and the second network domain.

For a specific implementation of the communication apparatus, refer to the behavior function of the controller in the routing information publishing method provided in any one of the seventh aspect or embodiments of the seventh aspect. Based on the communication apparatus in the eighth aspect, a controller receives the routing information based on the control plane protocol message, and sends the received routing information to the edge device, and the edge device automatically generates the forwarding table based on the received routing information. In this way, the routing information may be sent in a transport network by using an existing control plane protocol, to implement that a control plane in the transport network is reachable, and the routing information is sent without occupying a large quantity of data bandwidth resources in the transport network, and therefore network resources of a data plane in the transport network are saved. Furthermore, no massive transport pipes need to be pre-established to perform route flooding, and the edge device and the edge transport device do not need to generate the forwarding table by using the transport pipe in a route flooding learning manner, and therefore processing burden imposed on hardware resources when the edge device and the edge transport device generate the forwarding table in the route flooding learning manner is reduced. In addition, the edge device may automatically generate the forwarding table based on the routing information sent by the edge transport device, and the forwarding table does not need to be configured for the edge device in a static configuration manner, and therefore complexity and a workload of routing configuration are reduced, and a configuration time is shortened.

In an embodiment, the receiving module is further configured to receive second routing information that includes an address of the first edge device and a destination address of the first network domain from the first edge transport device based on the control plane protocol message; and the sending module is further configured to send the second routing information to the second edge transport device. The second routing information is used to generate a forwarding table that is of the second edge device and that is used to indicate the forwarding relationship between the first network domain and the second network domain.

Based on this embodiment, the controller receives the routing information based on the control plane protocol message, and sends the received routing information to the edge device, and the edge device automatically generates the forwarding table based on the received routing information. In this way, the routing information may be sent in a transport network by using an existing control plane protocol, to implement that a control plane in the transport network is reachable, and the routing information is sent without occupying a large quantity of data bandwidth resources in the transport network, and therefore network resources of a data plane in the transport network are saved. Furthermore, no massive transport pipes need to be pre-established to perform route flooding, and the edge device and the edge transport device do not need to generate the forwarding table by using the transport pipe in a route flooding learning manner, and therefore processing burden imposed on hardware resources when the edge device and the edge transport device generate the forwarding table in the route flooding learning manner is reduced. In addition, the edge device may automatically generate the forwarding table based on the routing information sent by the edge transport device, and the forwarding table does not need to be configured for the edge device in a static configuration manner, and therefore complexity and a workload of routing configuration are reduced, and a configuration time is shortened.

In an embodiment, the receiving module is further configured to receive first routing information from a plurality of second edge transport devices in the transport network; and the sending module is further configured to send the received first routing information from the plurality of second edge transport devices to the first edge transport device based on a same control plane protocol message.

Based on this embodiment, the controller may send the first routing information from the plurality of second edge transport devices to the first edge transport device based on the same control plane protocol message, to reduce signaling interaction.

In an embodiment, the receiving module is further configured to receive second routing information from a plurality of first edge transport devices in the transport network; and the sending module is further configured to send the received second routing information from the plurality of first edge transport devices to the second edge transport device based on a same control plane protocol message.

Based on this embodiment, the controller may send the second routing information from the plurality of first edge transport devices to the second edge transport device based on the same control plane protocol message, to reduce signaling interaction.

In an embodiment, the first edge transport device is a user-side edge transport device, and the second edge transport device is a server-side edge transport device; or the first edge transport device is a server-side edge transport device, and the second edge transport device is a user-side edge transport device.

Based on this embodiment, the first edge transport device may be a user-side edge transport device, and the second edge transport device may be a server-side edge transport device; or the first edge transport device may be a server-side edge transport device, and the second edge transport device may be a user-side edge transport device. This is not limited. In other words, the method in this embodiment may be implemented by the user-side device or the server-side device. In this way, implementation flexibility of the method is improved.

In an embodiment, the sending module is further configured to send the first routing information to the first edge transport device based on the control plane protocol message; and the sending module is further configured to send the second routing information to the second edge transport device based on the control plane protocol message.

Based on this embodiment, the controller may send the routing information to the edge transport device based on the control plane protocol message, to implement that the control plane is reachable, and there is no need to occupy a large quantity of data bandwidth resources, and therefore network resources of the data plane are saved.

According to a ninth aspect, a communication apparatus is provided. The communication apparatus may be a controller or a chip or a system on chip in a controller. The communication apparatus may implement the function performed by the controller in the foregoing aspect or embodiments. The function may be implemented by hardware. In an embodiment, the communication apparatus may include a transceiver. The transceiver may be configured to support the communication apparatus in implementing the function in any one of the seventh aspect or embodiments of the seventh aspect. For example, the transceiver may be configured to receive first routing information that includes an address of a second edge device and a destination address of a second network domain from a second edge transport device based on a control plane protocol message, and the transceiver may be further configured to send the first routing information to a first edge transport device. The first routing information is used to generate a forwarding table that is of a first edge device and that is used to indicate a forwarding relationship between a first network domain and the second network domain. In still another embodiment, the communication apparatus may further include a storage. The storage is configured to store computer-executable instructions and data that are necessary for the communication apparatus. When the communication apparatus runs, the transceiver executes the computer-executable instructions stored in the storage, so that the communication apparatus performs the routing information publishing method in any one of the seventh aspect or embodiments of the seventh aspect.

For a specific implementation of the communication apparatus, refer to the behavior function of the edge transport device in the routing information publishing method provided in any one of the seventh aspect or embodiments of the seventh aspect.

According to a tenth aspect, a communication apparatus is provided. The communication apparatus includes one or more processors and one or more storages. The one or more storages are coupled to the one or more processors, and the one or more storages are configured to store computer program code or computer instructions. When the one or more processors execute the computer instructions, the communication apparatus is enabled to perform the routing information publishing method in any one of the seventh aspect or embodiments of the seventh aspect.

According to an eleventh aspect, a computer-readable storage medium is provided. The computer-readable storage medium stores computer instructions or a program. When the computer instructions or the program are or is run on a computer, the computer is enabled to perform the routing information publishing method in any one of the seventh aspect or embodiments of the seventh aspect.

According to a twelfth aspect, a computer program product that includes instructions is provided. When the computer program product is run on a computer, the computer is enabled to perform the routing information publishing method in any one of the seventh aspect or embodiments of the seventh aspect.

For technical effects brought by any embodiments of the ninth aspect to the twelfth aspect, refer to the technical effects brought by any embodiment of the seventh aspect and the eighth aspect. Details are not described.

According to a thirteenth aspect, a communication system is provided. The communication system includes the communication apparatus in any one of the second aspect or embodiments of the second aspect and the communication apparatus in any one of the eighth aspect or embodiments of the eighth aspect.

BRIEF DESCRIPTION OF DRAWINGS

FIG. 4a is a schematic diagram of a frame structure of routing information according to an embodiment of this application;

FIG. 4b is a schematic diagram of a frame structure of a destination address according to an embodiment of this application;

FIG. 4c is a schematic diagram of a frame structure of routing information according to an embodiment of this application;

FIG. 7 is a schematic diagram of a frame structure of second routing information according to an embodiment of this application;

FIG. 8 is a schematic diagram of a forwarding table according to an embodiment of this application;

FIG. 9 is a schematic diagram of composition of a communication apparatus according to an embodiment of this application; and FIG. 10 is a schematic diagram of composition of a communication apparatus according to an embodiment of this application.

DESCRIPTION OF EMBODIMENTS

A routing information publishing method provided in embodiments of this application is described below with reference to the accompanying drawings of the specification.

Figure 1A:
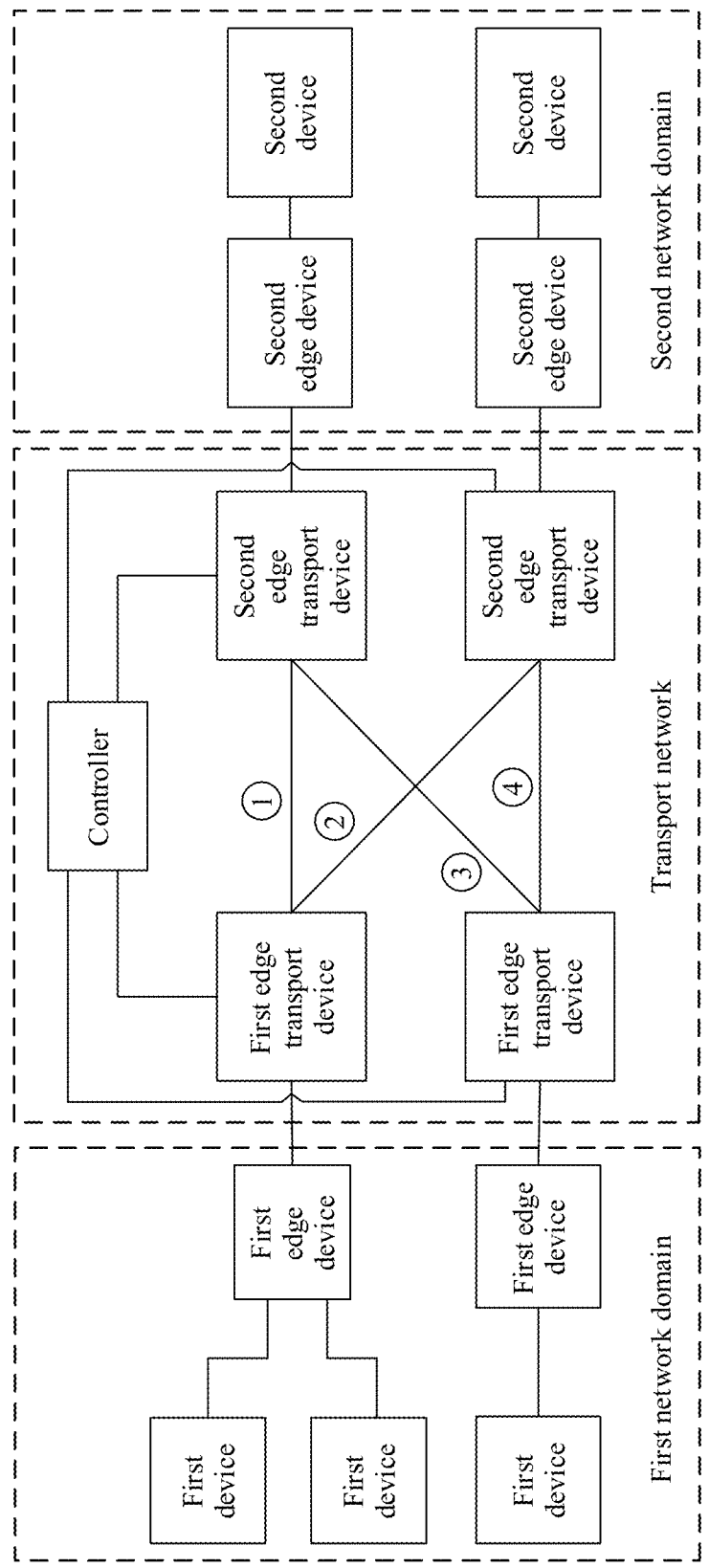
FIG. 1a is a simplified schematic diagram of a communication system according to an embodiment of this application.

The routing information publishing method provided in embodiments of this application may be applied to a communication system shown in FIG. 1a. The communication system includes a first network domain, a transport network, and a second network domain. The transport network is used to connect the first network domain to the second network domain, to transmit service data between the first network domain and the second network domain.

Specifically, the transport network may be a network used to transmit the service data, for example, may be a network such as an optical transport network (OTN) or a synchronous digital hierarchy (SDH) network. This is not limited. The first network domain and the second network domain may be internet protocol (IP) networks.

The routing information publishing method provided in embodiments of this application is described below by using FIG. 1a and FIG. 1b as examples.

Specifically, the transport network may include a plurality of transport pipes, a first edge transport device, and a second edge transport device. For example, as shown in FIG. 1a, the transport network may include a transport pipe ①, a transport pipe ②, a transport pipe ③, and a transport pipe ④. For each transport pipe, there is the first edge transport device at one end, and there is the second edge transport device at the other end. The first edge transport device may be connected to at least one first edge device, and the second edge transport device may be connected to at least one second edge device. In other words, a connection is established between the first edge device and the second edge device by using the transport pipe. Different transport pipes correspond to different bandwidth and delays. Different transport pipes are applied to transmitting different service data, to implement bandwidth isolation and delay stability, so as to meet a user requirement.

Further, as shown in FIG. 1a, the transport network may further include a controller, and the transport network is centrally controlled by the controller. The controller may be a software-defined networking (SDN) controller independently deployed outside the transport network or a central control unit (CCU) located in the transport network.

It should be noted that the controller may not be limited to being centrally deployed in the transport network, as shown in FIG. 1a, or may be deployed independent of the transport network. A name of the transport pipe is not limited in embodiments of this application. For example, when the transport network is an OTN, the transport pipe may be named an OTN pipe.

The first network domain may include at least one first edge device and at least one first device connected to the first edge device. The first edge device may be a device that sends/receives service data that includes a destination address, or the first edge device may be a device configured to transmit service data between the first device and the transport network.

Similarly, the second network domain may include at least one second edge device and at least one second device connected to the second edge device. The second edge device may be a device that sends/receives service data that includes a destination address, or the second edge device may be a device configured to transmit service data between the second device and the transport network.

In embodiments of this application, the first network domain and the second network domain are two network domains that transmit service data to each other via the transport network. For example, the first network domain sends service data to the second network domain via the transport network. As shown in FIG. 1a, the first device sends service data that includes a destination address to the first edge device. The destination address is used to identify the second device. The first edge device determines an IP address of a next-hop second edge device of the first edge device in a preconfigured routing table based on the destination address in the received service data, determines a MAC address of the next-hop second edge device of the first edge device based on a preconfigured ARP table, and sends the service data to the next-hop second edge device of the first edge device through the OTN pipe based on the MAC address. The next-hop second edge device forwards the service data to the corresponding second device based on the destination address in the received service data.

It should be noted that a process in which the second network domain sends service data to the first network domain via the transport network is similar to the foregoing process. Details are not described.

For example, the first network domain may be a user-side network domain, and the second network domain may be a server-side network domain; or the first network domain may be a server-side network domain, and the second network domain may be a user-side network domain.

For example, the first network domain is a user-side network domain, the transport network is the OTN, and the second network domain is a server-side network domain. In this case, the first device may be a user-side network device, the first edge device may be a user-side edge device, the first edge transport device may be a user-side edge OTN device, the second edge transport device may be a server-side edge OTN device, the second edge device may be a server-side edge device, and the second device may be a server-side network device. A connection may be established between the user-side edge device and the server-side edge device by using an OTN pipe. For the OTN pipe, there is the user-side edge OTN device at one end, and there is the server-side edge OTN device at the other end.

Figure 1B:
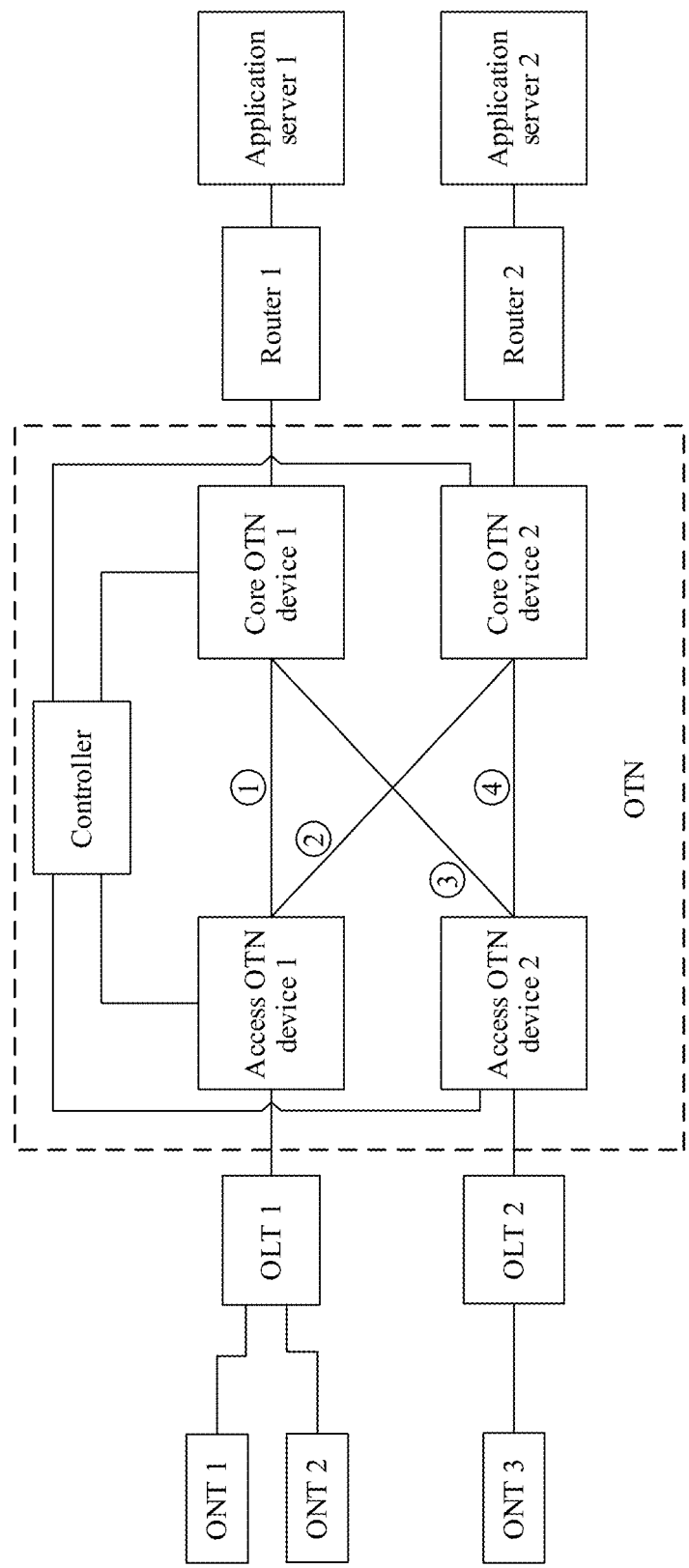
FIG. 1b is a simplified schematic diagram of a communication system according to an embodiment of this application.

For example, the user-side network device may be an ONT shown in FIG. 1b, the user-side edge device may be an OLT shown in FIG. 1b, the user-side edge transport device may be an access OTN device shown in FIG. 1b, the server-side edge transport device may be a core OTN device shown in FIG. 1b, the server-side edge device may be a routing switch device such as a gateway or a router shown in FIG. 1b, and the server-side network device may be an application server shown in FIG. 1b.

The ONT shown in FIG. 1b may be further connected to at least one user equipment. The user equipment (UE) may be referred to as a terminal, a mobile station (MS), a mobile terminal (MT), or the like. Specifically, the user equipment may be a mobile phone, a tablet computer, or a computer with a wireless transceiver function. The user equipment may alternatively be a virtual reality (VR) terminal, an augmented reality (AR) terminal, a wireless terminal in industrial control, a wireless terminal in self-driving, a wireless terminal in telemedicine, a wireless terminal in a smart grid, a wireless terminal in a smart city, a wireless terminal in a smart home, a vehicle-mounted terminal, or the like. This is not limited.

It should be noted that the at least one first device, the at least one first edge device, at least one first edge transport device, at least one second edge transport device, the at least one second edge device, and the at least one second device in embodiments of this application may be one or more chips, a system on chip (SoC), or the like. FIG. 1a is merely an example drawing. A quantity of devices included in the communication system is not limited. In addition, in addition to the device shown in FIG. 1a, the communication system may further include another device. Names of the devices and the transport pipes in FIG. 1a are not limited. In addition to the names shown in FIG. 1a, other names may be used for the devices and the transport pipes. For example, when the first network domain communicates with the second network domain by using the OTN, the transport pipe may be named an OTN pipe. This is not limited.

FIG. 1b is used as an example. When service data is transmitted between the OLT and the router by using the OTN pipe, forwarding needs to be performed based on a preconfigured routing table and an ARP table. In an existing communication system to which the OTN is applied, the forwarding table and the ARP table may be configured for the OLT and the router in a static configuration manner or a route flooding learning manner. However, there are an excessively large quantity of OLTs in the communication system. If the static configuration manner is applied, there is highly complex and time-consuming routing configuration and a heavy workload in the entire communication system. If the route flooding learning manner is applied, a relatively large quantity of OTN pipes are preconfigured because there are an excessively large quantity of OLTs in the network, and when route flooding is performed, there is excessively heavy burden on hardware resources such as a CPU and a memory of each OLT and each router in the communication system. The OLT is usually a small device, and it is very difficult to support this manner. In addition, in a data transmission process, an OTN pipe that is not used still occupies network resources because the OTN pipe is configured, resulting in a waste of network resources.

To resolve the foregoing technical problem, embodiments of this application provide the routing information publishing method. The method is applied to an edge transport device located in a transport network. The edge transport device may be a first edge transport device or a second edge transport device. For example, the edge transport device is the first edge transport device. The method includes: The first edge transport device receives first routing information from a controller based on a control plane protocol message, where the first routing information includes an address of a second edge device and a destination address of a second network domain; and the first edge transport device sends the first routing information to a first edge device, so that the first edge device generates, based on the first routing information, a forwarding table used to indicate a forwarding relationship between a first network domain and the second network domain. Similarly, operations performed by the second edge transport device are consistent with the operations performed by the first edge transport device. Details are not described. Specifically, for the routing information publishing method provided in embodiments of this application, refer to description in the following embodiments corresponding to FIG. 3, FIG. 5, and FIG. 6.

In this way, the edge transport device may receive, based on a control plane protocol, the routing information sent by the controller, and send the received routing information to the edge device, and the edge device automatically generates the forwarding table based on the received routing information. In this way, the routing information may be sent in the transport network by using the existing control plane protocol, to implement that a control plane in the transport network is reachable, and the routing information is sent without occupying a large quantity of data bandwidth resources in the transport network, and therefore network resources of a data plane in the transport network are saved. Furthermore, no massive transport pipes need to be pre-established to perform route flooding, and the edge device and the edge transport device do not need to generate the forwarding table by using the transport pipe in a route flooding learning manner, and therefore processing burden imposed on hardware resources when the edge device and the edge transport device generate the forwarding table in the route flooding learning manner is reduced. In addition, the edge device may automatically generate the forwarding table based on the routing information sent by the edge transport device, and the forwarding table does not need to be configured for the edge device in a static configuration manner, and therefore complexity and a workload of routing configuration are reduced, and a configuration time is shortened.

Figure 2:
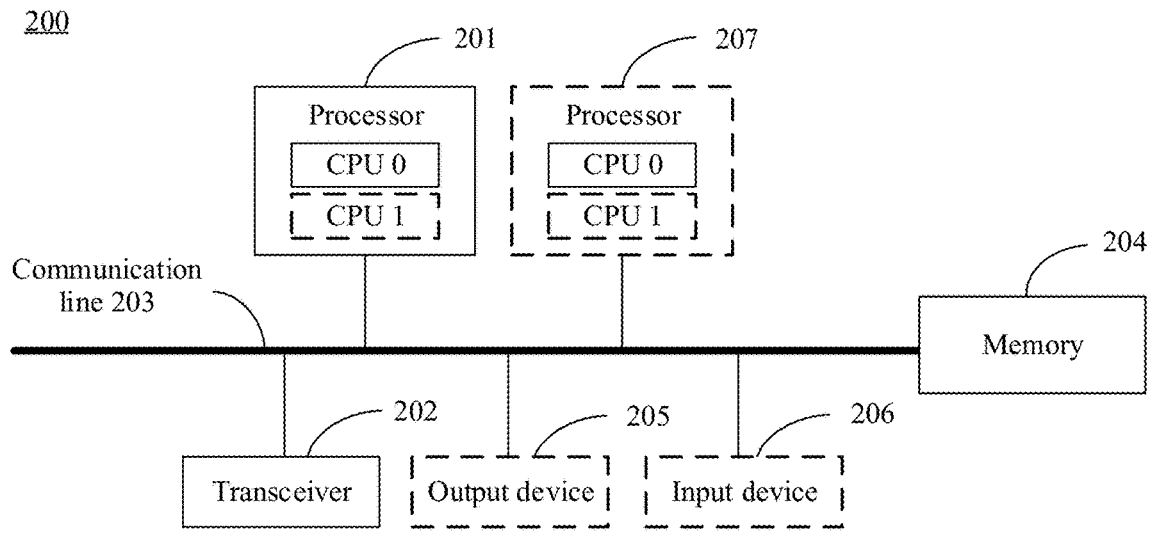
FIG. 2 is a schematic diagram of composition of a communication apparatus according to an embodiment of this application.

During specific implementation, each of the devices, for example, the first device, the first edge device, the first edge transport device, the controller, the second edge transport device, the second edge device, and the second device, in FIG. 1a, may use a composition structure shown in FIG. 2, or include components shown in FIG. 2. FIG. 2 is a schematic diagram of composition of a communication apparatus 200 according to an embodiment of this application. The communication apparatus 200 may be a first device or a chip or a system on chip in a first device, may be a first edge device or a chip or a system on chip in a first edge device, may be a first edge transport device or a chip or a system on chip in a first edge transport device, may be a controller or a chip or a system on chip in a controller, may be a second edge transport device or a chip or a system on chip in a second edge transport device, may be a second edge device or a chip or a system on chip in a second edge device, or may be a second device or a chip or a system on chip in a second device. As shown in FIG. 2, the communication apparatus 200 includes a processor 201, a transceiver 202, and a communication line 203.

Further, the communication apparatus 200 may further include a storage 204. The processor 201, the storage 204, and the transceiver 202 may be connected by using the communication line 203.

The processor 201 is a central processing unit (CPU), a general-purpose network processor (NP), a digital signal processor (DSP), a microprocessor, a microcontroller, a programmable logic device (PLD), or any combination thereof. The processor 201 may alternatively be another apparatus with a processing function, for example, a circuit, a component, or a software module. This is not limited.

The transceiver 202 is configured to communicate with another device or another communication network. The another communication network may be Ethernet, a radio access network (RAN), a wireless local area network (WLAN), or the like. The transceiver 202 may be a module, a circuit, a transceiver, or any apparatus capable of implementing communication.

The communication line 203 is configured to transfer information between components included in the communication apparatus 200.

The storage 204 is configured to store instructions. The instruction may be a computer program.

The storage 204 may be a read-only memory (ROM) or another type of static storage device that can store static information and/or instructions, may be a random access memory (RAM) or another type of dynamic storage device that can store information and/or instructions, or may be an electrically erasable programmable read-only memory (EEPROM), a compact disc read-only memory (CD-ROM), other compact disc storage, optical disc storage (including a compact disc, a laser disc, an optical disc, a digital versatile disc, a Blu-ray disc, and the like), a disk storage medium, another magnetic storage device, or the like. This is not limited.

It should be noted that the storage 204 may exist independent of the processor 201, or may be integrated with the processor 201. The storage 204 may be configured to store instructions, program code, some data, or the like. The storage 204 may be located in the communication apparatus 200, or may be located outside the communication apparatus 200. This is not limited. The processor 201 is configured to execute the instructions stored in the storage 204, to implement the routing information publishing method provided in the following embodiments of this application.

In an example, the processor 201 may include one or more CPUs, for example, a CPU 0 and a CPU 1 in FIG. 2.

In an optional implementation, the communication apparatus 200 includes a plurality of processors. For example, in addition to the processor 201 in FIG. 2, the communication apparatus 200 may further include a processor 207.

In an optional implementation, the communication apparatus 200 further includes an output device 205 and an input device 206. For example, the input device 206 is a device such as a keyboard, a mouse, a microphone, or a joystick, and the output device 205 is a device such as a display or a speaker.

It should be noted that the communication apparatus 200 may be a desktop computer, a portable computer, a network server, a mobile phone, a tablet computer, a wireless terminal, an embedded device, a chip system, or a device that has a structure similar to that shown in FIG. 2. In addition, the composition structure shown in FIG. 2 constitutes no limitation on the communication apparatus. In addition to the components shown in FIG. 2, the communication apparatus may include more or fewer components than those shown in the figure, or combine some components, or have different component arrangements.

In embodiments of this application, the chip system may include a chip, or may include the chip and another discrete component.

In addition, mutual reference may be made to actions, terms, and the like in embodiments of this application. This is not limited. In embodiments of this application, a name of a message or a parameter name in a message exchanged between devices, or the like is merely an example. In specific implementation, another name may be applied. This is not limited.

With reference to the communication system shown in FIG. 1a, the routing information publishing method provided in embodiments of this application is described below by using an example in which a controller sends, to a first edge device by using a first edge transport device, first routing information of a second edge device that is sent by a second edge transport device. The second edge transport device may be any second edge transport device in FIG. 1a, the second edge device may be a second edge device connected to the second edge transport device in FIG. 1a, the first edge transport device may be any first edge transport device in FIG. 1a, and the first edge device may be a first edge device connected to the first edge transport device in FIG. 1a. The controller, the second edge transport device, the second edge device, the first edge transport device, and the first edge device in the following embodiments may include components shown in FIG. 2.

Figure 3:
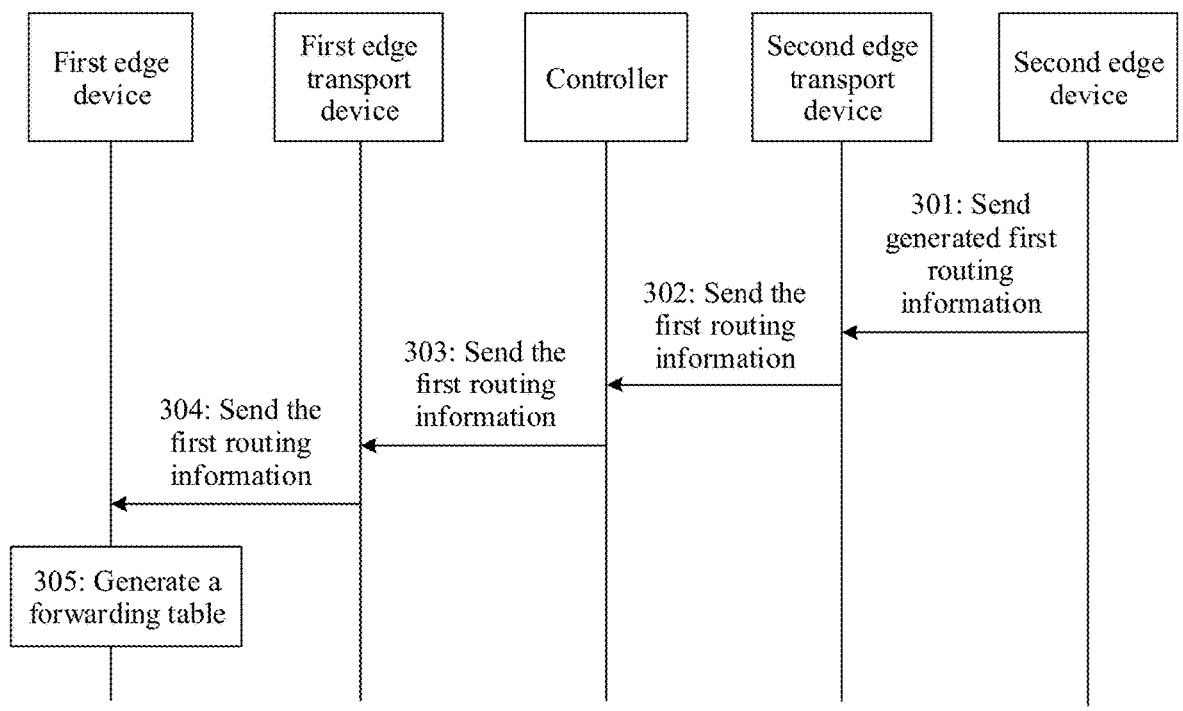
FIG. 3 is a schematic diagram of a routing information publishing method according to an embodiment of this application.

FIG. 3 is a schematic flowchart of a routing information publishing method according to this application. As shown in FIG. 3, the method includes the following operations.

Operation 301: A second edge device generates first routing information, and sends the first routing information to a second edge transport device.

The first routing information may include an address of the second edge device and a destination address of a second network domain. Optionally, the address of the second edge device includes an IP address and a MAC address. The destination address of the second network domain is an address of a second device connected to the second edge device. Specifically, the address of the second device includes an IP address.

It should be noted that one or more second devices may be connected to the second edge device. When one second device is connected to the second edge device, the second edge device may include the address of the second device in the first routing information by using the address of the second device as the destination address of the second network domain. When a plurality of second devices are connected to the second edge device, the second edge device may include addresses of the plurality of second devices in same first routing information by using the addresses of the plurality of second devices as the destination address of the second network domain, or the second edge device may generate a plurality of pieces of first routing information, and include an address of at least one second device in one piece of first routing information by using the address of the at least one second device as the destination address of the second network domain.

For example, the second edge device may send the first routing information to the second edge transport device by including the first routing information in an extended path computation element protocol (PCEP) packet.

In addition to the address of the second edge device and the destination address of the second network domain, the extended PCEP packet may further include other information in a packet header of the extended PCEP packet. As shown in FIG. 4a, the extended PCEP packet may further include a version number field, a flag bit field, a message type field, a message length field, an object type extension field, an object type field, a reserved field, a P field, an I field, and an object length field.

The message type field and the object type extension field use a new type value, and are used to identify that the extended PCEP packet carries the routing information described in this application. For description of another field in the packet header, refer to description of the header of the PCEP packet in the conventional technology. Details are not described.

Specifically, as shown in FIG. 4a, in the extended PCEP packet that carries the first routing information, the version number field occupies 3 bits, the flag bit field occupies 5 bits, the message type field occupies 8 bits, the message length field occupies 16 bits, the object type extension field occupies 8 bits, the object type field occupies 4 bits, the reserved field occupies 2 bits, the P field occupies 1 bit, the I field occupies 1 bit, the object length field occupies 16 bits, and the address of the second edge device occupies 80 bits. The address of the second edge device includes the IP address that occupies 32 bits and the MAC address that occupies 48 bits. A length of the destination address of the second network domain is variable.

For example, as shown in FIG. 4b, in addition to the IP address of the second device, the destination address of the second network domain may further include a type field that occupies 16 bits, a length field that occupies 16 bits, and an IP address prefix field that occupies 8 bits.

It should be noted that when the destination address of the second network domain in the first routing information includes an address of one second device, a message format shown in FIG. 4a may be used. When the destination address of the second network domain in the first routing information includes addresses of a plurality of second devices, a message format shown in FIG. 4c may be used. As shown in FIG. 4c, the first routing information may include a plurality of destination addresses such as a destination address 1 of the second network domain and a destination address 2 of the second network domain.

Specifically, the second edge device may generate the first routing information in the following manner: The second edge device may automatically discover the second device connected to the second edge device, obtain the address of the second device, and generate the first routing information based on the address of the second device and the address of the second edge device.

It should be noted that for a process in which the second edge device automatically discovers the second device, refer to the conventional technology. Details are not described.

Further, the second edge device may automatically discover the second device at an early stage of network planning, generate the first routing information, and send the first routing information to the second edge transport device.

Operation 302: The second edge transport device receives the first routing information, and sends the first routing information to a controller based on a control plane protocol message.

A control plane protocol may be a control plane protocol at a physical layer (PHY) or a control plane protocol at a lower layer, and the control plane protocol may support the second edge transport device in sending the first routing information to the controller by using the physical layer or the lower layer. For example, the control plane protocol may be a PCEP.

The control plane protocol message may be a message suitable for transmission on a control plane, and the control plane protocol may be a protocol between the second edge transport device and the controller.

Specifically, the second edge transport device may receive the first routing information from the second edge device by using a control protocol at a network layer or a data link layer, and send the first routing information to the controller based on a control plane protocol message at the physical layer.

It should be noted that each of the plurality of second edge devices shown in FIG. 1a may generate first routing information based on operation 301, and send the first routing information to a second edge transport device connected to the second edge device; and each of the plurality of second edge transport devices shown in FIG. 1a may send the first routing information of at least one second edge device that is received by the second edge transport device to the controller based on operation 302.

Operation 303: The controller receives the first routing information, and sends the first routing information to a first edge transport device based on a control plane protocol message.

The controller may be the controller shown in FIG. 1a. For related description of the control plane protocol message, refer to operation 302. Details are not described.

Further, the controller may receive first routing information sent by a plurality of second edge transport devices in a transport network, and send the plurality of pieces of received first routing information to the first edge transport device based on a same control plane protocol message, to reduce signaling interaction.

Operation 304: The first edge transport device receives the first routing information, and sends the first routing information to a first edge device.

The first edge device may be one or more edge devices connected to the first edge transport device.

Optionally, the first edge transport device sends the first routing information to the first edge device based on the control protocol at the network layer or the data link layer.

Operation 305: The first edge device receives the first routing information, and generates a forwarding table based on the first routing information.

The forwarding table may be used to indicate a forwarding relationship between a first network domain and the second network domain. The forwarding table may include a routing table and an ARP table.

Entries in the routing table may include a destination address, a next hop corresponding to the destination address, and an outbound interface corresponding to the destination address. Entries in the ARP table may include an IP address of the next hop and a MAC address corresponding to the IP address.

Specifically, when the first routing information includes the IP address of the second device, the IP address of the second edge device, and the MAC address of the second edge device, that the first edge device generates a forwarding table based on the first routing information may include:

generating the routing table by using the IP address of the second device as the destination address, using the IP address of the second edge device corresponding to the IP address of the second device as the next hop corresponding to the destination address, and using an outbound interface of the first edge device corresponding to the second edge device as the outbound interface; and generating the ARP table by using the IP address of the second edge device as the IP address of the next hop and using the MAC address of the second edge device corresponding to the IP address of the second edge device as the MAC address corresponding to the IP address.

Based on the method in FIG. 3, in an example in which there are m first edge devices and n second edge devices, if an existing route flooding learning manner is applied, m*n transport pipes need to be pre-established to implement route flooding. However, if the method in embodiments of this application is applied, only m connections for connecting the first edge device to the controller by using the first edge transport device and n connections for connecting the second edge device to the controller by using the second edge transport device need to be established. Compared with the m*n transport pipes in the existing route flooding learning manner, the (m+n) connections in embodiments of this application may be used to implement that the control plane is reachable. In addition, each control plane-based connection in embodiments of this application occupies only K-level bandwidth while the transport pipe occupies at least G-level bandwidth, and there is no need to occupy a large quantity of data bandwidth resources, and therefore network resources of a data plane are saved. Furthermore, no massive transport pipes need to be pre-established to perform route flooding, and therefore processing burden imposed on hardware resources when the first edge device and the edge transport device generate the forwarding table in the route flooding learning manner may be reduced. In addition, the first edge device and the second edge device automatically generate the forwarding table based on the received first routing information and received second routing information, and no static configuration is needed, and therefore complexity and a workload of routing configuration are reduced, and a configuration time is shortened.

In operation 301 to operation 305, the controller sends, to the first edge device by using the first edge transport device, the first routing information of the second edge device that is sent by the second edge transport device. Similar to FIG. 3, referring to FIG. 5, the controller may send, to the second edge device by using the second edge transport device, the second routing information of the first edge device that is sent by the first edge transport device.

Figure 5:
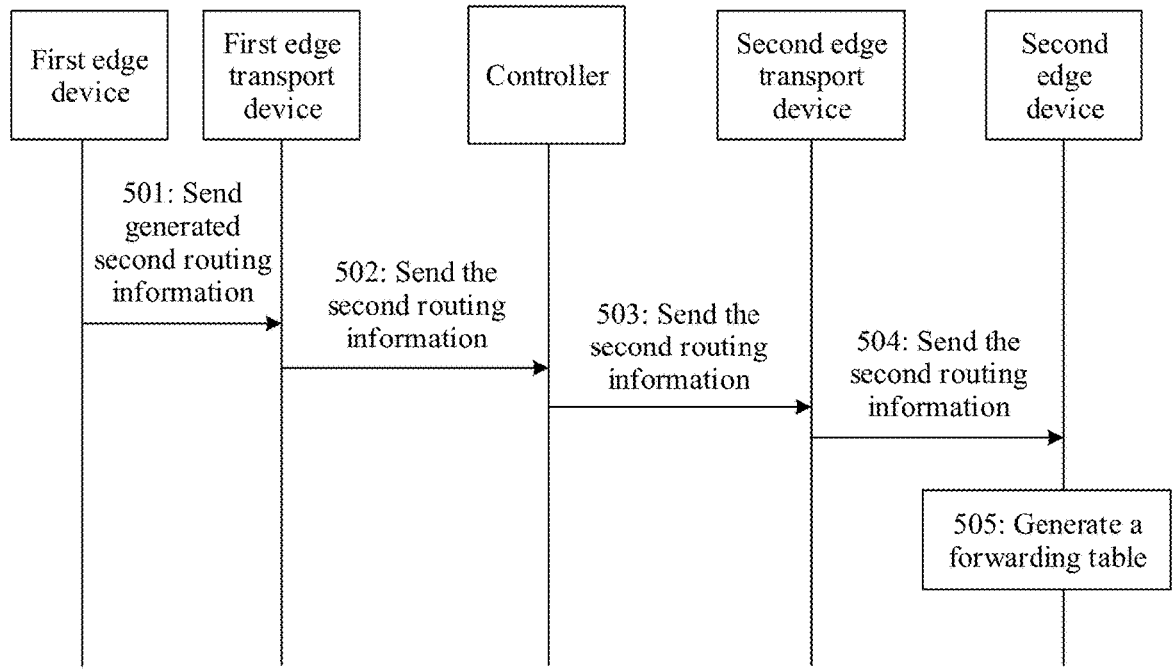
FIG. 5 is a schematic diagram of a routing information publishing method according to an embodiment of this application.

FIG. 5 is a schematic flowchart of a routing information publishing method according to this application. As shown in FIG. 5, the method includes the following operations.

Operation 501: A first edge device generates second routing information, and sends the second routing information to a first edge transport device.

The second routing information may include an address of the first edge device and a destination address of a first network domain. Optionally, the address of the first edge device includes an IP address and a MAC address. The destination address of the first network domain is an address of a first device connected to the first edge device. Specifically, the address of the first device includes an IP address.

Specifically, the second routing information is similar to first routing information. For related description of the second routing information, refer to the related description of the first routing information in operation 301. Details are not described.

Specifically, the first edge device may generate the second routing information in the following manner: The first edge device automatically discovers the first device connected to the first edge device, obtains the address of the first device, and generates the second routing information based on the address of the first device and the address of the first edge device.

It should be noted that for a process in which the first edge device automatically discovers the first device, refer to the conventional technology. Details are not described.

Further, the first edge device may automatically discover the first device at an early stage of network planning, generate the second routing information, and send the second routing information to the first edge transport device.

Operation 502: The first edge transport device receives the second routing information, and sends the second routing information to a controller based on a control plane protocol message.

Specifically, the processing process is similar to the processing process in operation 302. For related description of the processing process, refer to the related description in operation 302. Details are not described.

Operation 503: The controller receives the second routing information, and sends the second routing information to a second edge transport device based on a control plane protocol message.

Specifically, the processing process is similar to the processing process in operation 303. For related description of the processing process, refer to the related description in operation 303. Details are not described.

Operation 504: The second edge transport device receives the second routing information, and sends the second routing information to a second edge device.

Specifically, the processing process is similar to the processing process in operation 304. For related description of the processing process, refer to the related description in operation 304. Details are not described.

Operation 505: The second edge device receives the second routing information, and generates a forwarding table based on the second routing information.

The forwarding table may be used to indicate a forwarding relationship between the first network domain and a second network domain. The forwarding table may include a routing table and an ARP table.

Entries in the routing table may include a destination address, a next hop corresponding to the destination address, and an outbound interface corresponding to the destination address. Entries in the ARP table may include an IP address of the next hop and a MAC address corresponding to the IP address.

Specifically, when the second routing information includes the IP address of the first device, the IP address of the first edge device, and the MAC address of the first edge device, that the second edge device generates a forwarding table based on the second routing information may include: generating the routing table by using the IP address of the first device as the destination address, using the IP address of the first edge device corresponding to the IP address of the first device as the next hop corresponding to the destination address, and using an outbound interface of the second edge device corresponding to the first edge device as the outbound interface; and generating the ARP table by using the IP address of the first edge device as the IP address of the next hop and using the MAC address of the first edge device corresponding to the IP address of the first edge device as the MAC address corresponding to the IP address.

The routing information publishing manner provided in embodiments of this application is described below in detail by using an example in which the first network domain is a user-side network domain, the transport network is an OTN, and the second network domain is a server-side network domain.

Figure 6:
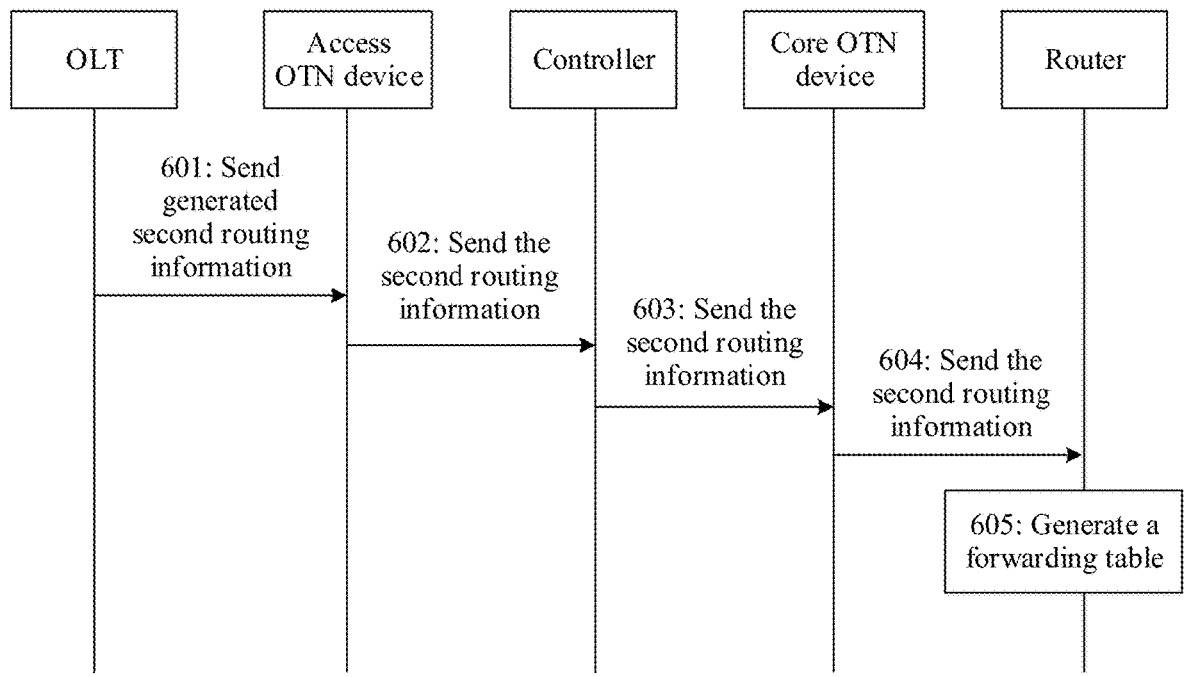
FIG. 6 is a schematic diagram of a routing information publishing method according to an embodiment of this application.

As shown in FIG. 1b, the user-side network domain includes an ONT and an OLT. The OTN includes a controller, an access OTN device, and a core OTN device. The server-side network domain includes a router and an application server. A destination address of the user-side network domain is an IP address of the ONT. A destination address of the server-side network domain is an IP address of the application server. Referring to FIG. 6, the routing information publishing method provided in embodiments of this application is described by using an example in which the controller sends, to the router by using the core OTN device, second routing information sent by the access OTN device.

FIG. 6 shows a routing information publishing manner according to an embodiment of this application. As shown in FIG. 6, the method includes the following operations.

Operation 601: An OLT generates second routing information, and sends the second routing information to an access OTN device.

The second routing information may include an IP address of the OLT, a MAC address of the OLT, and an IP address of an ONT connected to the OLT.

It should be noted that one or more ONTs may be connected to the OLT.

When one ONT is connected to the OLT, the OLT may generate the second routing information that includes the IP address of the OLT, the MAC address of the OLT, and an IP address of the ONT. FIG. 1b is used as an example. An OLT 2 may include an IP address of the OLT 2, a MAC address of the OLT 2, and an IP address of an ONT 3 in second routing information, and send the second routing information to an access OTN device 2.

When a plurality of ONTs are connected to the OLT, the OLT may include IP addresses of the plurality of ONTs in same second routing information. FIG. 1b is used as an example. An OLT 1 includes an IP address of the OLT 1, a MAC address of the OLT 1, an IP address of an ONT 1, and an IP address of an ONT 2 in second routing information, and sends the second routing information to an access OTN device 1. Alternatively, the OLT may generate a plurality of pieces of second routing information, and include an IP address of at least one ONT in one piece of second routing information. FIG. 1b is used as an example. An OLT 1 may include an IP address of the OLT 1, a MAC address of the OLT 1, and an IP address of an ONT 1 in second routing information 1, and send the second routing information 1 to an access OTN device 1; and include the IP address of the OLT 1, the MAC address of the OLT 1, and an IP address of an ONT 2 in second routing information 2, and send the second routing information 2 to the access OTN device 1.

Specifically, the OLT may send the second routing information to the access OTN device by including the second routing information in an extended PCEP packet. As shown in FIG. 7, for example, the OLT 1 includes the IP address of the OLT 1, the MAC address of the OLT 1, and the IP address of the ONT 1 in the second routing information, and sends the second routing information to the access OTN device 1. In this case, the extended PCEP packet may include the IP address of the OLT 1, the MAC address of the OLT 1, and the IP address of the ONT 1.

A packet header of the extended PCEP packet may further include a version number field, a flag bit field, a message type field, a message length field, an object type extension field, an object type field, a reserved field, a P field, an I field, and an object length field.

For example, a PCEP session may be established between the OLT and the access OTN device, and the second routing information is sent to the access OTN device by applying the extended PCEP packet.

Alternatively, a BGP session is established between the OLT and the access OTN device, and the second routing information is sent to the access OTN device by using the BGP session.

Operation 602: The access OTN device receives the second routing information, and sends the second routing information to a controller based on a control plane protocol message.

The control plane protocol message may be the foregoing extended PCEP packet.

FIG. 1*b* is used as an example. The access OTN device 1 may send the received second routing information that includes the IP address of the OLT 1, the MAC address of the OLT 1, the IP address of the ONT 1, and the IP address of the ONT 2 to the controller, and the access OTN device 2 sends the received second routing information that includes the IP address of the OLT 2, the MAC address of the OLT 2, and the IP address of the ONT 3 to the controller.

Operation 603: The controller receives the second routing information, and sends the second routing information to a core OTN device based on a control plane protocol message.

The control plane protocol message may be the foregoing extended PCEP packet.

FIG. 1*b* is used as an example. The controller may send the received second routing information that includes the IP address of the OLT 1, the MAC address of the OLT 1, the IP address of the ONT 1, and the IP address of the ONT 2 to a core OTN device 1 and a core OTN device 2, and further send the received second routing information that includes the IP address of the OLT 2, the MAC address of the OLT 2, and the IP address of the ONT 3 to the core OTN device 1 and the core OTN device 2.

Further, the controller may further include the second routing information that includes the IP address of the OLT 1, the MAC address of the OLT 1, the IP address of the ONT 1, and the IP address of the ONT 2 and the second routing information that includes the IP address of the OLT 2, the MAC address of the OLT 2, and the IP address of the ONT 3 in a same control plane protocol message, and send the second routing information to the core OTN device 1 and the core OTN device 2, to reduce signaling interaction.

Operation 604: The core OTN device receives the second routing information, and sends the second routing information to a router.

The core OTN device may send the second routing information to the router based on a control protocol at a network layer or a data link layer. The control protocol at the network layer or the link layer may be a BGP protocol or an ARP protocol.

FIG. 1*b* is used as an example. The core OTN device 1 may send the received second routing information that includes the IP address of the OLT 1, the MAC address of the OLT 1, the IP address of the ONT 1, and the IP address of the ONT 2 and the received second routing information that includes the IP address of the OLT 2, the MAC address of the OLT 2, and the IP address of the ONT 3 to a router 1.

The core OTN device 2 may send the received second routing information that includes the IP address of the OLT 1, the MAC address of the OLT 1, the IP address of the ONT 1, and the IP address of the ONT 2 and the received second routing information that includes the IP address of the OLT 2, the MAC address of the OLT 2, and the IP address of the ONT 3 to a router 2.

Operation 605: The router receives the second routing information, and generates a forwarding table of the router based on the second routing information.

The forwarding table may include a routing table and an ARP table.

The second routing information that includes the IP address of the OLT 1, the MAC address of the OLT 1, the IP address of the ONT 1, and the IP address of the ONT 2 and the second routing information that includes the IP address of the OLT 2, the MAC address of the OLT 2, and the IP address of the ONT 3 that are received by the router 1 are used as an example. As shown in FIG. 8, in the generated routing table, a destination address includes the IP address of the ONT 1, the IP address of the ONT 2, and the IP address of the ONT 3; a next hop includes the IP address of the OLT 1 corresponding to the IP address of the ONT 1, the IP address of the OLT 1 corresponding to the IP address of the ONT 2, and the IP address of the OLT 2 corresponding to the IP address of the ONT 3; and an outbound interface includes an outbound interface of a router corresponding to the OLT 1 and an outbound interface of a router corresponding to the OLT 2. In the generated ARP table, an IP address of the next hop includes the IP address of the OLT 1 and the IP address of the OLT 2; and a MAC address corresponding to the IP address of the next hop includes the MAC address of the OLT 1 and the MAC address of the OLT 2.

For example, different next hops may correspond to outbound interfaces of different routers. For example, the OLT 1 may correspond to an outbound interface 1 of the router 1, and the OLT 2 may correspond to an outbound interface 2 of the router.

During transmission of service data, FIG. 1*b* is used as an example. When an application server 1 needs to send the service data to the ONT 1, the application server 1 includes the IP address of the ONT 1 in the service data, and sends the service data to the router 1 connected to the application server 1. The router 1 determines, based on the routing table shown in FIG. 8, that a next hop corresponding to the IP address of the ONT 1 is the IP address of the OLT 1 and a corresponding outbound interface is the outbound interface 1 of the router, determines, based on the ARP table shown in FIG. 8, that the IP address of the OLT 1 corresponds to the MAC address of the OLT 1, includes the MAC address of the OLT 1 in the service data, and sends the service data to the core OTN device 1 through the outbound interface 1. The core OTN device 1 sends the service data to the access OTN device 1 through an OTN pipe based on the MAC address of the OLT 1. The access OTN device 1 sends the service data to the OLT 1 based on the MAC address of the OLT 1. The OLT 1 sends the service data to the ONT 1 based on the IP address of the ONT 1 that is included in the service data.

In operation 601 to operation 605, the controller sends, to the router by using the core OTN device, the second routing information of the OLT that is sent by the access OTN device.

Similar to FIG. 6, the controller may further send, to the OLT by using the access OTN device, first routing information of the router that is sent by the core OTN device, so that the OLT generates a forwarding table based on the first routing information. The processing process is similar to the processing process shown in FIG. 6. The OLT generates a routing table and an ARP table based on the first routing information of a plurality of routers that is sent by the access OTN device. Entries in the routing table include an IP address of an application server, an IP address of a router corresponding to the application server, and an outbound interface of an OLT corresponding to the router. The ARP table includes the IP address of the router and a MAC address corresponding to the IP address of the router.

FIG. 1b is used as an example. When the ONT 1 needs to send service data to the application server 1, the ONT 1 includes an IP address of the application server 1 in the service data, and sends the service data to the OLT 1 connected to the ONT 1. The OLT 1 determines, based on the pre-generated routing table, that a next hop corresponding to the application server 1 is an IP address of the router 1 and a corresponding outbound interface is an outbound interface of the OLT 1 corresponding to the router 1, and determines, based on the pre-generated ARP table, that the IP address of the router 1 corresponds to a MAC address of the router 1, includes the MAC address of the router 1 in the service data, and sends the service data to the access OTN device 1 through the outbound interface of the OLT 1 corresponding to the router 1. The access OTN device 1 sends the service data to the core OTN device 1 through the OTN pipe based on the MAC address of the router 1. The core OTN device 1 sends the service data to the router 1 based on the MAC address of the router 1. The router 1 sends the service data to the application server 1 based on the IP address of the application server 1 that is included in the service data.

The solutions provided in embodiments of this application are mainly described above from a perspective of interaction between the devices. It may be understood that to implement the foregoing functions, each device includes a corresponding hardware structure and/or software module for implementing each function. A person of ordinary skill in the art should easily be aware that, in combination with algorithms and operations in the examples described in the embodiments disclosed in this specification, this application can be implemented by hardware or a combination of the hardware and computer software. Whether a function is performed by hardware or hardware driven by computer software depends on a particular application and a design constraint of the technical solutions. A person skilled in the art may use different methods to implement the described functions for each particular application, but it should not be considered that the implementation goes beyond the scope of this application.

In embodiments of this application, each network element may be divided into functional modules based on the foregoing method example. For example, each functional module may be obtained through division based on each corresponding function, or two or more functions may be integrated into one processing module. The integrated module may be implemented in a form of hardware, or may be implemented in a form of a software functional module. It should be noted that, in embodiments of this application, division into the modules is an example and is merely logical function division, and may be other division in an actual implementation.

When each functional module is obtained through division based on each corresponding function, FIG. 9 shows a communication apparatus. The communication apparatus 90 may be an edge transport device or a chip or a system on chip in an edge transport device. The communication apparatus 90 may be configured to perform the function of the edge transport device in the foregoing embodiments. The communication apparatus 90 shown in FIG. 9 includes a receiving module 901 and a sending module 902.

The receiving module 901 is configured to receive first routing information that includes an address of a second edge device and a destination address of a second network domain from a controller based on a control plane protocol message.

The sending module 902 is configured to send the first routing information to a first edge device. The first routing information is used to generate a forwarding table that is of the first edge device and that is used to indicate a forwarding relationship between a first network domain and the second network domain.

For a specific implementation of the communication apparatus 90, refer to the behavior function of the edge transport device in the routing information publishing method in FIG. 3, FIG. 5, and FIG. 6.

In an embodiment, the receiving module 901 is further configured to receive second routing information that includes an address of the first edge device and a destination address of the first network domain from the first edge device; and the sending module 902 is further configured to send the second routing information to the controller.

In an embodiment, the address includes an IP address and/or a MAC address.

In an embodiment, the forwarding table includes a routing table and/or an ARP table.

In an embodiment, the first edge device is a user-side network device, and the second edge device is a server-side network device; or the first edge device is a server-side network device, and the second edge device is a user-side network device.

In an embodiment, the sending module 902 is further configured to send the first routing information to the first edge device based on a control protocol at a network layer or a data link layer.

In still another implementation, the receiving module 901 and the sending module 902 in FIG. 9 may be replaced with a transceiver, and functions of the receiving module 901 and the sending module 902 may be integrated into the transceiver. Further, the communication apparatus 90 shown in FIG. 9 may further include a storage. When the receiving module 901 and the sending module 902 are replaced with a transceiver, the communication apparatus 90 in this embodiment of this application may be the communication apparatus shown in FIG. 2.

When each functional module is obtained through division based on each corresponding function, FIG. 10 shows a communication apparatus. The communication apparatus 100 may be a controller or a chip or a system on chip in a controller. The communication apparatus 100 may be configured to perform the function of the controller in the foregoing embodiments. The communication apparatus 100 shown in FIG. 10 includes a receiving module 1001 and a sending module 1002.

The receiving module 1001 is configured to receive first routing information that includes an address of a second edge device and a destination address of a second network domain from a second edge transport device based on a control plane protocol message.

The sending module 1002 is configured to send the first routing information to a first edge transport device. The first routing information is used to generate a forwarding table that is of a first edge device and that is used to indicate a forwarding relationship between a first network domain and the second network domain.

For a specific implementation of the communication apparatus 100, refer to the behavior function of the controller in the routing information publishing method in FIG. 3, FIG. 5, and FIG. 6.

In an embodiment, the receiving module 1001 is further configured to receive second routing information that includes an address of the first edge device and a destination address of the first network domain from the first edge transport device based on the control plane protocol message; and the sending module 1002 is further configured to send the second routing information to the second edge transport device. The second routing information is used to generate a forwarding table that is of the second edge device and that is used to indicate the forwarding relationship between the first network domain and the second network domain.

In an embodiment, the receiving module 1001 is further configured to receive first routing information from a plurality of second edge transport devices in a transport network; and the sending module 1002 is further configured to send the received first routing information from the plurality of second edge transport devices to the first edge transport device based on a same control plane protocol message.

In an embodiment, the receiving module 1001 is further configured to receive second routing information from a plurality of first edge transport devices in the transport network; and the sending module 1002 is further configured to send the received second routing information from the plurality of first edge transport devices to the second edge transport device based on a same control plane protocol message.

In an embodiment, the first edge transport device is a user-side edge transport device, and the second edge transport device is a server-side edge transport device; or the first edge transport device is a server-side edge transport device, and the second edge transport device is a user-side edge transport device.

In an embodiment, the sending module 1002 is further configured to send the first routing information to the first edge transport device based on the control plane protocol message; and the sending module 1002 is further configured to send the second routing information to the second edge transport device based on the control plane protocol message.

An embodiment of this application further provides a computer-readable storage medium. All or some of the processes in the foregoing method embodiments may be completed by a computer program instructing related hardware. The program may be stored in the foregoing computer-readable storage medium. When the program is executed, the processes of the foregoing method embodiments may be performed. The computer-readable storage medium may be an internal storage unit of the terminal (including a data transmit end and/or a data receive end) in any one of the foregoing embodiments, for example, a hard disk drive or a memory of the terminal. Alternatively, the computer-readable storage medium may be an external storage device of the terminal, for example, a plug-in hard disk, a smart media card (SMC), a secure digital (SD) card, a flash card, or the like that are configured on the terminal. Further, the computer-readable storage medium may alternatively include both the internal storage unit of the terminal and the external storage device. The computer-readable storage medium is configured to store the computer program and other programs and data that are required by the terminal. The computer-readable storage medium may be further configured to temporarily store data that has been output or is to be output.

It should be noted that, in the specification, claims, and accompanying drawings of this application, terms "first", "second", and the like are intended to distinguish between different objects but do not indicate a particular order. In addition, the terms "including", "having", and any other variant thereof are intended to cover a non-exclusive inclusion. For example, a process, method, system, product, or device that includes a series of operations or units is not limited to the listed operations or units, but optionally further includes an unlisted operation or unit, or optionally further includes another inherent operation or unit of the process, method, product, or device.

It should be understood that in this application, "at least one (item)" means one or more, "a plurality of" means two or more, and "at least two (items)" means two, three, or more. The term "and/or" is used to describe an association relationship between associated objects, and indicates that three relationships may exist. For example, "A and/or B" may indicate the following three cases: Only A exists, only B exists, and both A and B exist, where A and B may be singular or plural. The character "/" usually represents an "or" relationship between the associated objects. "At least one item (piece) of the following" or a similar expression thereof means any combination of these items, including a singular item (piece) or any combination of plural items (pieces). For example, at least one (piece) of a, b, or c may represent: a, b, c, "a and b", "a and c", "b and c", or "a, b, and c", where a, b, and c may be singular or plural.

The foregoing descriptions of the implementations allow a person skilled in the art to clearly understand that, for the purpose of convenient and brief description, division into only the foregoing functional modules is used as an example for description. During actual application, the foregoing functions can be allocated to different functional modules for implementation as required. In other words, an inner structure of an apparatus is divided into different functional modules to implement all or some of the functions described above.

In the several embodiments provided in this application, it should be understood that the disclosed apparatuses and methods may be implemented in other manners. For example, the foregoing apparatus embodiments are merely examples. For example, division into the modules or units is merely logical function division. There may be another division manner during actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or the units may be implemented in electrical, mechanical, or other forms.

The units described as separate parts may or may not be physically separate, and parts displayed as units may be one or more physical units, may be located in one place, or may be distributed on different places. A part or all of the units may be selected based on actual requirements to achieve the objectives of the solutions of embodiments.

In addition, functional units in embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in the form of a software product. The software product is stored in a storage medium and includes several instructions for instructing a device (which may be a single-chip microcomputer, a chip, or the like) or a processor to perform all or some of the operations of the methods described in embodiments of this application. The foregoing storage medium includes any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A routing information publishing method, comprising:
   receiving, by an edge transport device, first routing information from a controller based on a control plane protocol message, wherein the first routing information comprises an address of a second edge device and a destination address of a second network domain, wherein the edge transport device is located in a transport network and the transport network is centrally controlled by the controller, wherein the transport network is used to connect a first network domain and the second network domain, the first network domain comprises a first edge device, the second network domain comprises a second edge device, and the edge transport device is connected to the first edge device; and
   sending, by the edge transport device, the first routing information to the first edge device, wherein the first routing information is used to generate a routing table and an address resolution protocol (ARP) table of the first edge device, the routing and ARP tables are used to indicate a forwarding relationship between the first network domain and the second network domain, and wherein the transport network is of a first type of network, and the first network domain or the second network domain belong to a second type of network that is different from the first type of network.

2. The method according to claim 1, further comprising:
   receiving, by the edge transport device, second routing information from the first edge device, wherein the second routing information comprises an address of the first edge device and a destination address of the first network domain; and
   sending, by the edge transport device, the second routing information to the controller.

3. The method according to claim 1, wherein the address of the second edge device comprises the internet protocol (IP) address and the media access control (MAC) address.

4. The method according to claim 1, wherein
   the first edge device is a user-side network device, and the second edge device is a server-side network device; or
   the first edge device is a server-side network device, and the second edge device is a user-side network device.

5. The method according to claim 1, wherein the sending, by the edge transport device, the first routing information to the first edge device comprises:
   sending, by the edge transport device, the first routing information to the first edge device based on a control protocol at a network layer or a data link layer.

6. The method according to claim 1, wherein an internet protocol (IP) address of a next hop for the first edge device is determined based on the routing table, a media access control (MAC) address corresponding to the IP address of the next hop is determined based on the ARP table, and service data is sent to the next hop based on the MAC address.

7. The method according to claim 1, wherein the first type of network is an optical transport network (OTN) and the second type of network is an internet protocol (IP) network.

8. A routing information publishing method, comprising:
   receiving, by a controller, first routing information from a second edge transport device based on a control plane protocol message, wherein the first routing information comprises an address of a second edge device and a destination address of a second network domain, wherein the controller centrally controls a transport network comprising a first edge transport device and the second edge transport device, the transport network is used to connect a first network domain and the second network domain, the first network domain comprises a first edge device, the second network domain comprises the second edge device, the first edge transport device is connected to the first edge device, the second edge transport device is connected to the second edge device; and
   sending, by the controller, the first routing information to the first edge transport device, wherein the first routing information is used to generate a routing table and an address resolution protocol (ARP) table of the first edge device, the routing and ARP tables are used to indicate a forwarding relationship between the first network domain and the second network domain, and wherein the transport network is of a first type of network, and the first network domain or the second network domain belong to a second type of network that is different from the first type of network.

9. The method according to claim 8, further comprising:
   receiving, by the controller, second routing information from the first edge transport device based on the control plane protocol message, wherein the second routing information comprises an address of the first edge device and a destination address of the first network domain; and
   sending, by the controller, the second routing information to the second edge transport device, wherein the second routing information is used to generate a routing table and an ARP table of the second edge device, and the routing table and the ARP table are used to indicate a forwarding relationship between the first network domain and the second network domain.

10. The method according to claim 9, further comprising:
    receiving, by the controller, second routing information from a plurality of first edge transport devices in the transport network; and
    sending, by the controller, the received second routing information from the plurality of first edge transport devices to the second edge transport device based on a same control plane protocol message.

11. The method according to claim 9, wherein the sending, by the controller, the second routing information to the second edge transport device comprises:
sending, by the controller, the second routing information to the second edge transport device based on the control plane protocol message.

12. The method according to claim 8, further comprising:
receiving, by the controller, first routing information from a plurality of second edge transport devices in the transport network; and
sending, by the controller, the received first routing information from the plurality of second edge transport devices to the first edge transport device based on a same control plane protocol message.

13. The method according to claim 8, wherein
the first edge transport device is a user-side edge transport device, and the second edge transport device is a server-side edge transport device; or
the first edge transport device is a server-side edge transport device, and the second edge transport device is a user-side edge transport device.

14. The method according to claim 8, wherein the sending, by the controller, the first routing information to the first edge transport device comprises:
sending, by the controller, the first routing information to the first edge transport device based on the control plane protocol message.

15. A communication system, comprising a first network domain, a transport network, and a second network domain, wherein the transport network is centrally controlled by a controller, the transport network is used to connect the first network domain and the second network domain, the transport network comprises a first edge transport device and a second edge transport device, the first network domain comprises a first edge device, the second network domain comprises a second edge device, the first edge transport device is connected to the first edge device, and the second edge transport device is connected to the second edge device;
the controller comprises a first processor that configures the controller to receive first routing information from the second edge transport device based on a control plane protocol message, wherein the first routing information comprises an address of the second edge device and a destination address of the second network domain; and to send the first routing information to the first edge transport device; and
the first edge transport device comprises a second processor that configures the first edge transport device to receive the first routing information from the controller based on the control plane protocol message, and to send the first routing information to the first edge device, wherein the first routing information is used to generate a routing table and an address resolution protocol (ARP) table of the first edge device, the routing and ARP tables are used to indicate a forwarding relationship between the first network domain and the second network domain, and wherein the transport network is of a first type of network, and the first network domain or the second network domain belong to a second type of network that is different from the first type of network.

16. The communication system according to claim 15, wherein the controller is further configured to receive second routing information from the first edge transport device based on the control plane protocol message, wherein the second routing information comprises an address of the first edge device and a destination address of the first network domain; and
the controller is further configured to send the second routing information to the second edge transport device, wherein the second routing information is used to generate a routing table and an ARP table of the second edge device, and the routing table and the ARP table are used to indicate a forwarding relationship between the first network domain and the second network domain.

17. The communication system according to claim 15, wherein the controller is further configured to receive first routing information from a plurality of second edge transport devices in the transport network; and
the controller is further configured to send the received first routing information from the plurality of second edge transport devices to the first edge transport device based on a same control plane protocol message.

18. The communication system according to claim 15, wherein the first edge transport device is further configured to receive second routing information from the first edge device, wherein the second routing information comprises an address of the first edge device and a destination address of the first network domain; and
the first edge transport device is further configured to send the second routing information to the controller.

19. The communication system according to claim 15, wherein the address of the second edge device comprises the internet protocol (IP) address and the media access control (MAC) address.

20. The communication system according to claim 15, wherein
the first edge device is a user-side network device, and the second edge device is a server-side network device; or
the first edge device is a server-side network device, and the second edge device is a user-side network device.

* * * * *